US009355278B2

United States Patent
Sankar et al.

(10) Patent No.: US 9,355,278 B2
(45) Date of Patent: May 31, 2016

(54) SERVER CHASSIS PHYSICAL SECURITY ENFORCEMENT

(71) Applicant: Microsoft Corporation, Redmond, WA (US)

(72) Inventors: Sriram Sankar, Redmond, WA (US); David T. Gauthier, Seattle, WA (US); Scott Longheyer, Bellevue, WA (US); Gregory Joseph McKnight, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 14/142,702

(22) Filed: Dec. 27, 2013

(65) Prior Publication Data

US 2015/0186677 A1   Jul. 2, 2015

(51) Int. Cl.
| G06F 21/00 | (2013.01) |
| G06F 21/71 | (2013.01) |
| H04L 29/06 | (2006.01) |
| G06F 21/32 | (2013.01) |
| G06F 21/86 | (2013.01) |
| G06F 21/88 | (2013.01) |

(52) U.S. Cl.
CPC .............. *G06F 21/71* (2013.01); *G06F 21/32* (2013.01); *G06F 21/86* (2013.01); *G06F 21/88* (2013.01); *H04L 63/10* (2013.01)

(58) Field of Classification Search
None
See application file for complete search history.

(56) References Cited

U.S. PATENT DOCUMENTS

| 2005/0081074 A1 | 4/2005 | Chheda et al. |
| 2008/0271122 A1* | 10/2008 | Nolan et al. ................ 726/4 |
| 2010/0024001 A1 | 1/2010 | Campbell et al. |

(Continued)

FOREIGN PATENT DOCUMENTS

| JP | 2002133538 A | 5/2002 |
| WO | 2013048102 A2 | 4/2013 |
| WO | 2013082443 A1 | 6/2013 |

OTHER PUBLICATIONS

"iTouch Biometrics", Retrieved on: Jun. 27, 2013, Available at: http://itouchbiometrics.com/main/biometric-access-control/.

(Continued)

*Primary Examiner* — Hadi Armouche
*Assistant Examiner* — Andrew Steinle
(74) *Attorney, Agent, or Firm* — Henry Gabryjelski; Kate Drakos; Micky Minhas

(57) ABSTRACT

Discrete-component-level physical security is provided by the physical securing of defined hardware computing components through computer-controlled processes. Physical locking mechanisms are provided for individual components of a datacenter server chassis and are communicationally coupled to a computing device, which controls the state of the physical locking mechanisms, including in response to user identification and authentication information provided through a user input device that is also part of the server chassis. An access control list controlling physical access correlates user identities to the state of the physical locking mechanisms and other physical security devices and provides for one-time passwords and other like mechanisms. The state of physical security devices are also based on security requirements associated with processing being performed on one or more computing devices protected by such physical security devices. The server chassis can also comprise a backup power source for the physical locking mechanisms.

20 Claims, 3 Drawing Sheets

(56) References Cited

U.S. PATENT DOCUMENTS

2010/0277866 A1* 11/2010 Chen ..................... 361/679.57
2013/0027204 A1 1/2013 Groth et al.
2013/0061311 A1 3/2013 Whitmyer, Jr.

OTHER PUBLICATIONS

Shinder, Debra Littlejohn, "10 Physical Security Measures Every Organization Should Take", Published on: Jul. 16, 2007, Available at: http://www.techrepublic.com/blog/10things/10-physical-security-measures-every-organization-should-take/106.

Vanover, Rick, "Lock IT Down: Control Physical Access to Your Server Room", Published on: May 7, 2001, Available at: http://www.techrepublic.com/article/lock-it-down-control-physical-access-to-your-server-room/1041309.

"International Search Report & Written Opinion for PCT Patent Application No. PCT/US2014/071774", Mailed Date: Mar. 23, 2015, 11 Pages.

* cited by examiner

SERVER CHASSIS PHYSICAL SECURITY ENFORCEMENT

BACKGROUND

The throughput of communications between computing devices continues to increase as modern networking hardware enables physically separate computing devices to communicate with one another orders of magnitude faster than was previously possible. Furthermore, high-speed network communication capabilities are being made available to a greater number of people, both in the locations where people work, and in their homes. As a result, an increasing amount of data and services can be meaningfully provided to an increasing audience via such network communications. In particular, it has become more practical to perform digital data processing at a location remote from the location where such data is initially generated, and where the processed data will be consumed. For example, a user can upload a digital photograph to a server and then cause the server to process the digital photograph, changing its colors and applying other visual edits to it. In such an example, the digital processing, such as of the photograph, is being performed by a device that is remote from the user. In another, more common, example, users utilize services and functionality that are conceptually simple, such as search services, but which, in fact, require vast amounts of processing capability.

To provide such data and processing capabilities, via network communications, from a centralized location, the centralized location typically comprises hundreds or thousands of computing devices, typically mounted in vertically oriented racks. Such a collection of computing devices, as well as the associated hardware necessary to support such computing devices, and the physical structure that houses the computing devices and associated hardware, is traditionally referred to as a "data center". With the increasing availability of high-speed network communication capabilities, and thus the increasing provision of data and services from centralized locations, as well as the traditional utilization of data centers, such as the provision of advanced computing services and massive amounts of computing processing capability, the size and quantity of data centers continues to increase.

However, by centralizing data storage and processing in a data center, the need to protect such data, and the associated computing devices and other hardware, increases. For example, even a simple, honest mistake, such as a technician replacing one wrong hard drive, can result in a loss of data, or, at least, a loss of data availability, for thousands of customers of the data center. A malicious action, such as, for example, the removal and destruction of multiple server blades, storage devices, and the like, can cause even more hardship for an even greater number of customers. Furthermore, in many instances, the data processing performed at the data center can carry with it minimum security requirements such as, for example, the need to have a video surveillance surrounding the computing equipment performing such processing. Such security requirements can limit the ability of data centers to shift processing between multiple computing devices and groups of computing devices to provide reliability and uptime. More specifically, processing having associated with it minimum security requirements can only be shifted among computing devices supporting those security requirements.

Existing mechanisms, directed to providing physical security of computing devices and associated components in a data center, are cumbersome. Such mechanisms are implemented at too coarse a level and, as such, introduce inefficiencies into the operation of a data center. For example, physical locks are typically implemented on doors allowing access to the data center or specific portions of the data center. However, once someone has gained access, they have an equal amount of access to every computing device and component within the data center, or within a particular room of the data center. Consequently, a technician who is only supposed to replace a single component, has access to every component and, thus, the potential for error is introduced. Similarly, if the data center is to offer the ability, to its customers, to perform processing associated with certain minimum security requirements, such as the need for video surveillance, then the data center must implement such security requirements across all of the components of the data center, or risk losing the ability to transfer processing from one set of components to another, which can be a significant ability, as processing is often transferred among computing devices in a data center, including due to computing device maintenance, refresh and failure.

SUMMARY

In one embodiment, physical locking mechanisms can be provided for one or more individual components of a server chassis, such as would typically be implemented in a data center. The physical locking mechanisms can be communicationally coupled to a computing device, which can be either a remote computing device, or can be co-located on the server chassis with the physical locking mechanisms. Such a computing device can control the state of the physical locking mechanisms.

In another embodiment, a server chassis can further comprise a user input device by which a user can provide identification and authentication information. Based on the information provided, physical locking mechanisms for one or more individual components of the server chassis can be activated, or deactivated, thereby enabling more precise access control for the individual components of the server chassis.

In yet another embodiment, an access control list controlling physical access can correlate user identities, corresponding to one or more individual humans, to the state of the physical locking mechanisms and other physical security devices. Upon receiving identification and authentication information, such a physical access control list can be consulted to determine the appropriate states of the physical locking mechanisms and other physical security devices. To the extent that such physical locking mechanisms and other physical security devices are not already in the determined appropriate state, instructions transitioning such devices to the determined appropriate state can be issued.

In a further embodiment, the state of physical security devices can also be based on security requirements associated with processing being performed on one or more computing devices protected by such physical security devices. In such a manner, the physical security devices can be responsive to the commencement, and termination, of processing, having specific security requirements, by the computing devices being protected by such physical security devices.

In a still further embodiment, a server chassis can comprise a backup power source that can provide for the physical locking mechanisms and other physical security devices to transition to an appropriate default state in the event of a loss of power.

In a yet further embodiment, an access control list controlling physical access can accommodate one-time passwords, or other like mechanisms, by which discrete access to discrete computational hardware can be granted for a defined period of time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
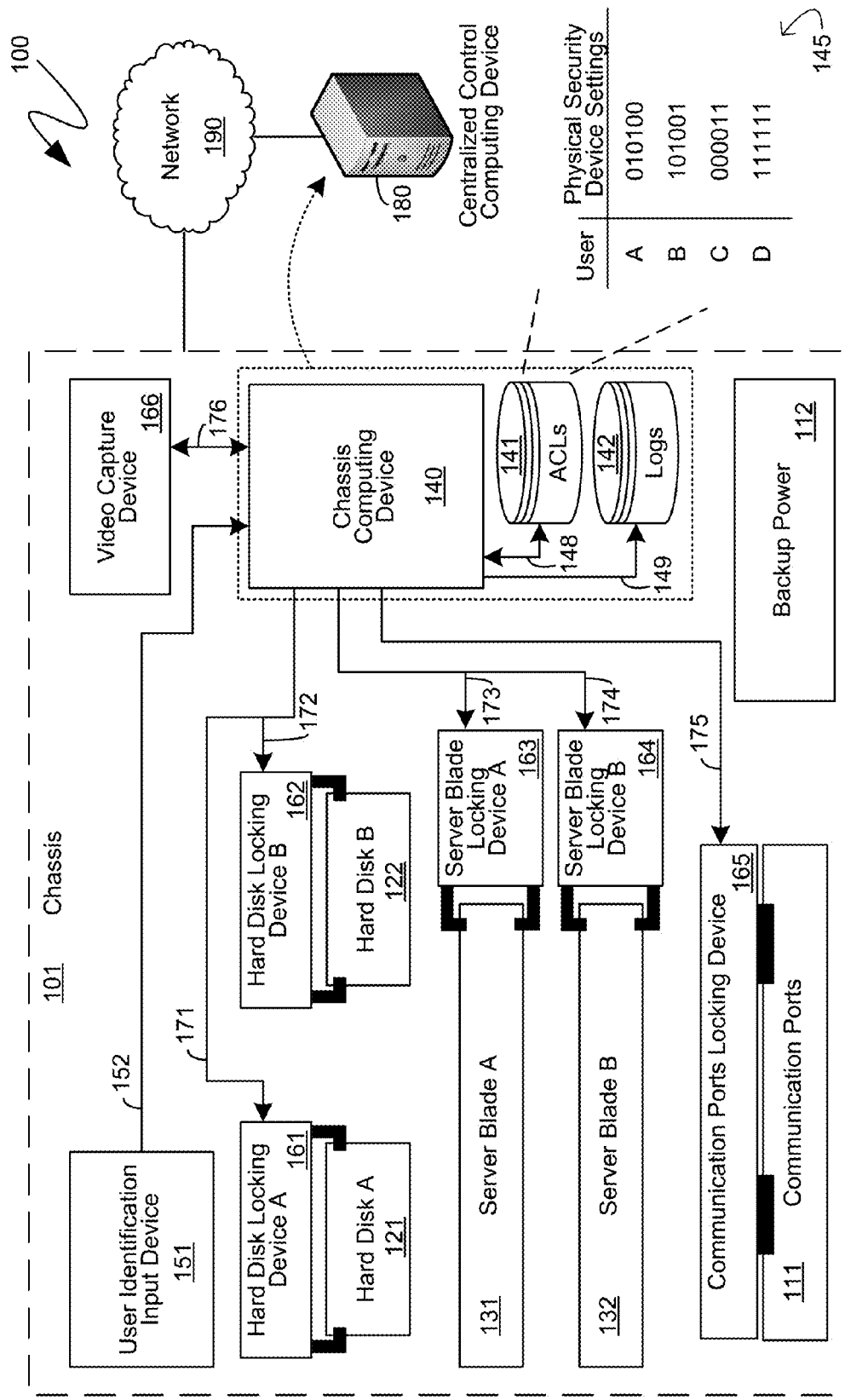
FIG. 1 is a component diagram of an exemplary interconnectivity between physical security components protecting computing hardware and corresponding control computing devices.

The following description relates to the physical securing of defined hardware computing components through computer-controlled processes, thereby providing for discrete-component-level physical security, especially within data center computing environments. Physical locking mechanisms can be provided for one or more individual components of a server chassis, such as would typically be implemented in a data center. The physical locking mechanisms can be communicationally coupled to a computing device, which can be either a remote computing device, or can be co-located on the server chassis with the physical locking mechanisms. Such a computing device can control the state of the physical locking mechanisms, including in response to user identification and authentication information, which can be provided through a user input device that is also part of the server chassis. Based on the information provided, physical locking mechanisms for one or more individual components of the server chassis can be activated, or deactivated, thereby enabling more precise access control for the individual components of the server chassis. An access control list controlling physical access can correlate user identities, corresponding to one or more individual humans, to the state of the physical locking mechanisms and other physical security devices. Additionally, the access control list controlling physical access can accommodate one-time passwords, or other like mechanisms, by which discrete access to discrete computational hardware can be granted for a defined period of time. The state of physical security devices can also be based on security requirements associated with processing being performed on one or more computing devices protected by such physical security devices. In such a manner, the physical security devices can be responsive to the commencement, and termination, of processing, having specific security requirements, by the computing devices being protected by such physical security devices. The server chassis can also comprise a backup power source that can provide for the physical locking mechanisms and other physical security devices to transition to an appropriate default state in the event of a loss of power.

The techniques described herein make reference to specific types of equipment, namely specific types of computing hardware and specific types of physical security devices. For example, the descriptions are provided within the context of a server chassis comprising multiple server blades, multiple storage devices, and other like computing hardware, such as would typically be found in a data center environment. Such references, however, are strictly exemplary and are made for ease of description and presentation, and are not intended to limit the mechanisms described to specific devices. Instead, the techniques described herein are equally applicable, without modification, to any computing device or hardware having components which are desired to be individually physically secured.

Although not required, aspects of the descriptions below will be provided in the general context of computer-executable instructions, such as program modules, being executed by a computing device. More specifically, aspects of the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional server computing racks or conventional personal computers, and include other computing configurations, including handheld devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary system 100 is illustrated, comprising an exemplary server chassis 101, such as would typically be found in data center computing environments. As will be recognized by those skilled in the art, a server chassis, such as the exemplary server chassis 101, typically comprises hardware capabilities for accepting one or more server computing devices, typically in the form of server blade computing devices, such as the exemplary server blade computing devices 131 and 132 shown in FIG. 1. More specifically, the server chassis 101 provides electrical power, cooling, access to network communications, access to computer-readable storage devices, and other like connectivity and support features to the blade server computing devices that are plugged into such a chassis. By centralizing such connectivity and support features into a server chassis, such as the exemplary server chassis 101, efficiencies can be realized, since such connectivity and support features need not be individually duplicated by each server blade.

In addition, as will also be recognized by those skilled in the art, a server chassis, such as the exemplary server chassis 101, typically comprises hardware capabilities for accepting one or more computer-readable storage media, such as in the form of the exemplary hard disks 121 and 122 shown in FIG. 1. A server chassis, such as the exemplary server chassis 101, can also comprise communication ports 111 by which the server chassis 101 and computing devices communicationally coupled thereto, such as the exemplary server blades 131 and 132, can communicate with other computing devices, including over a network, such as via the exemplary network 190, which is also part of the system 100 shown in FIG. 1. In other embodiments, the communication ports 111 can be part of the individual server blade computing devices, such as the exemplary server blades 131 and 132. In such other embodiments, typically only one server blade's communication ports have cabling physically connected thereto and the other server blades communicate through such communication ports via the communicational pathways between server blades in the same server chassis that are provided by the server chassis.

Often, server chassis, such as exemplary server chassis 101, can comprise one or more chassis computing devices, such as the exemplary chassis computing device 140. Such chassis computing devices can, as will be recognized by those skilled in the art, typically be power efficient computing devices that have lower computational ability than, for example, the server blade computing devices plugged into the server chassis. Rather than performing processing on behalf of customers of the data center, chassis computing devices, such as the exemplary chassis computing device 140, can perform processing directed to the features and functionality of the server chassis itself, including, for example, monitoring and reporting the status of various components of the server chassis, as well as controlling such components.

A data center typically comprises many hundreds or thousands of such server chassis, such as the exemplary server chassis 101 shown in FIG. 1, which are typically oriented in racks and then placed into climate controlled rooms. As indicated previously, physical security is typically limited to door locks and other like security devices that control access to a room of many hundreds of server chassis or, at the lowest granularity, blocks that control access to a rack of server chassis which can comprise several dozen individual server blades, data storage devices, and other like computing hardware. A user having a physical key that can open a door lock, or unlock a rack, is provided equal access to any and all computing hardware within the room protected by such a door, or within the unlocked rack. Consequently, if the user is not careful, the user can physically disrupt the processing performed by such computing hardware. For example, a user seeking to replace a defective server blade can, accidentally, remove and replace a different server blade that was functioning properly. In addition to leaving a defective server blade taking up valuable resources, such a user can also have interrupted the processing being performed by the server blade that the user did remove, thereby risking data loss, and negatively impacting at least some customers of the data center, namely those customers whose processing was being performed by the server blade that was improperly removed. As another example, a malicious user, having gained access to a room, or at least a rack, of server computing devices, can physically destroy all of the server computing devices, and associated computing hardware, that the user has physical access to, thereby even more negatively impacting customers of the data center, and the datacenters capabilities to provide data processing to such customers.

In one embodiment, therefore, a server chassis, such as the exemplary server chassis 101, can comprise physical security devices that can physically prevent removal of one or more computing components of the server chassis. For example, one type of physical security device can be a server blade locking device, such as the exemplary server blade locking devices 163 and 164, illustrated in FIG. 1. A server blade locking device, as that term is utilized herein, means any physical construct that is responsive to electrical control and is operable, at least through such electrical control, to alternatively prevent and allow the removal of a server blade from a server chassis. A server blade locking device can, optionally, also include a physical key, or other like manual override mechanism, which can be utilized to control, and, optionally, override, the server blade locking device's allowance or prevention of the removal of a server blade. In one embodiment, a server blade locking device can comprise one or more protrusions that physically prevent the removal of the server blade from a server chassis. In another embodiment, the server blade locking device can comprise one or more panels, flaps, doors or other like gate mechanisms that can physically prevent the removal of a server blade from a server chassis.

Another exemplary type of physical security device that can be utilized within the context of the server chassis, such as the exemplary server chassis 101, can be a hard disk locking device, such as the exemplary hard disk locking devices 161 and 162 shown in FIG. 1. As with the server blade locking device described above, a hard disc locking device, as that term is utilized herein, means any physical construct that is responsive to electrical control and is operable, at least through such electrical control, to alternatively prevent and allow the removal of one or more computer-readable storage devices from a server chassis. As with a server blade locking device, a hard disk locking device can, in one embodiment, comprise one or more protrusions that physically prevent the removal of one or more computer-readable storage devices from a server chassis. In another embodiment, the hard disk locking device can comprise one or more panels, flaps, doors or other like gate mechanisms that can physically prevent the removal of one or more computer-readable storage devices from a server chassis. Additionally, like the above described server blade locking device, a hard disk locking device can, optionally, also include a physical key, or other like manual override mechanism, which can be utilized to control, and, optionally, override, the hard disk locking device's allowance or prevention of the removal of one or more computer-readable storage devices from a server chassis.

Yet another exemplary type of physical security device that can be utilized within the context of a server chassis, can be a communication ports locking device, such as the exemplary communication ports locking device 165, which can act to protect one or more of the communication ports 111. More specifically, a communication ports locking device, as that term is utilized herein, means any physical construct that is responsive to electric control and is operable, at least through such electrical control, to alternatively prevent and allow the insertion or removal of one or more cables into one or more communication ports. For example, in one embodiment, a communication ports locking device, such as the exemplary communication ports locking device 165, can comprise one or more panels, flaps, doors or other like gate mechanisms that can physically cover one or more communication ports and, thereby, prevent the insertion of one or more cables into such communication ports. Depending on the design of such gate mechanisms, they can likewise prevent the removal of one or more cables once such cables are already communicatively coupled with one or more communication ports. Communication ports locking devices can, like the locking devices described in detail above, optionally include a physical key, or other like manual override mechanism, which can be utilized to control, and, optionally, override, the prevention and allowance of the insertion or removal of one or more cables into one or more communication ports.

In addition to locking devices, physical security devices that can be utilized within the context of a server chassis can include monitoring devices, such as the exemplary video capture device 166 illustrated as part of the server chassis 101 in FIG. 1. In one embodiment, the monitoring devices, such as the exemplary video capture device 166, can be electronically controllable, including having the ability to activate and deactivate such monitoring devices via electrical communication signals. The output of such monitoring devices can be provided to one or more computing devices for archival storage, analysis, or combinations thereof. For example, the communicational connection 176, shown in FIG. 1, illustrates the provision of video information from the exemplary video capture device 166 to the exemplary chassis computing device 140. In another embodiment, illustrated by the dashed lines around the chassis computing device 140 and associated information stores 141 and 142, the data and processing associated with the chassis computing device 140 and information stores 141 and 142 can be equally located and performed on computing devices external to the server chassis 101, such as, for example, the exemplary centralized control computing device 180 which can be communicationally coupled with the exemplary server chassis 101 via the network 190. Thus, in such another embodiment, the video capture device 166 can be communicationally coupled with the centralized control computing device 180, and can provide captured video information thereto.

Other physical security devices that can be utilized within the context of a server chassis can include user identification input devices, such as the exemplary user identification input device 151 shown in FIG. 1. As utilized herein, user identification input device means any device or combination of devices through which a user can provide input at which the user can identify and/or authenticate themselves. For example, one type of user identification input device can be a keypad through which a user can enter identifying information, such as a username, password, PIN (Personal Identification Number), or other like identification or authentication information. Another example of the user identification input device can be a fingerprint reader or other like biometric input device. In one embodiment, combinations of user identification input devices can be utilized. Like the exemplary video capture device 166, described previously, the user identification input device 151 can, in one embodiment, be communicationally coupled with the chassis computing device 140, as illustrated by the communicational connection 152. Via such a communicational connection 152, the user identification input entered into the user identification input device 151 can be provided to the chassis computing device 140. As indicated previously, in one embodiment, the processing performed by the chassis computing device 140 can, instead, be performed by one or more computing devices external to the server chassis 101, such as, for example, centralized control computing device 180. In such other embodiment, user identification input received via the user identification input device 151 can be provided to such centralized control computing device 180.

In one embodiment, user identification input, such as that which can be received through the user identification input device 151, can be utilized, in conjunction with access control information, such as one or more physical access control lists, to determine whether a user should be provided with physical access to one or more of the components of the server chassis, such as exemplary server chassis 101. Such a determination can be made by the chassis computing device 140, which can be co-located, on the server chassis 101, with the components that are being physically protected. In another embodiment, as illustrated by the dashed box and arrow in FIG. 1, the processing, data and communicational connections illustrated as being associated with the chassis computing device 140 can, instead, be associated with a computing device external to the server chassis 101, including, for example, one or more computing devices that can provide centralized control over multiple server chassis, such as exemplary server chassis 101. Thus, in such another embodiment, determinations whether a user should be provided with physical access to one or more components of the server chassis, based on user identification input and one or more physical access control lists can, equally, be made by computing devices external to the server chassis 101, such as, for example, the exemplary centralized control computing device 180.

A physical access control list, such as the exemplary physical access control list 145, shown in the system 100 of FIG. 1, can correlate individual users, or groups of users, with defined physical access rights to one or more components of a server chassis, and, optionally, other security aspects, which can include both physical security actions and logical actions. More specifically, a physical access control list can define physical access rights based on the physical state of one or more physical security devices. For example, if a user was allowed to remove the exemplary server blade 131, then the physical access control list can include information associating an unlocked state of the server blade locking device 163 with such a user. As another example, if a user was allowed to insert or remove network cabling, then the physical access control list can include information associating an unlocked state of the communication ports locking device 165 with such a user. To illustrate such an association, the exemplary physical access control list 145 shown in FIG. 1 associates users with a binary sequence representing the state of individual physical security devices, mainly whether such devices are in a locked state, which can, for example, be represented by the binary value of "zero", or an unlocked state, which can, for example, be represented by the binary value of "one". Thus, for example, the user "A" is shown as being associated, in the exemplary physical access control list 145, with individual physical security device settings that correspond to leaving all of the physical security devices in a locked state except for, for example, the server blade locking device 164 and the hard disk locking device 162 which can, as an example, be indicated to be in an unlocked state, as evidenced by the binary value of "one" assigned to such physical security devices.

In other embodiments, a physical access control list need not directly correlate users, or groups of users, with specific physical security device settings or states. Instead, in such other embodiments, a physical access control list can correlate users, or groups of users, with specific access rights, such as, for example, the right to access the server blade 131. Additional information can then associate the ability to access the server blade 131 with the necessary corresponding state of the server blade locking device 163, namely that the server blade locking device 163 needs to be in an unlocked state in order for access to the server blade 131 to be possible. For ease of illustration, the physical access control list store 141 is shown as a single entity. However, such an illustration is not meant to indicate that all of the relevant information is co-located. For example, a physical access control list, such as exemplary physical access control list 145, could be stored on an access control lists store that is co-located with the centralized control computing device 180. Additional information, such as that described in detail above, associating physical access rights with specific states of physical security devices, can be co-located with the server chassis 101. Consequently, the illustration of the physical access control lists store 141 is meant to encompass all such permutations in embodiments, and is shown as a single store only for ease of illustration.

Upon receiving user identification input, such as via the communication 152, from the user identification input device 151, the chassis computing device 140 can reference the information in the physical access control lists store 141, such as via the communication 148, and can receive therefrom, again, such as via the communication 148, information indicative of the physical states that the one or more physical security devices should be in in order to grant such a user the access with which such a user is associated in the physical access control lists. With such information, the chassis computing device 140 can poll the various physical security devices to determine their state and, if necessary, can instruct the various physical security devices to transition to a different state in accordance with the information obtained from the physical access control list store 141. For example, if the user identification input, such as would be received via the user identification input device 151, was determined by the chassis computing device 140 to correspond to a user having the right to physically access the server blade 131, then the chassis computing device 140 can verify that the server blade locking device 163 is in an unlocked state, and, if the server blade locking device 163 is not in an unlocked state, then the chassis computing device 140 can instruct the server blade locking device 163 to transition to an unlocked state, such as via the communication 173. In a similar manner, continuing with the present example, the chassis computing device 140 can also verify that other physical security devices are in appropriate states, such as, for example, verifying that the hard disk locking devices 161 and 162, the server blade locking device 164, and the communication ports locking device 165 are all in a locked state. If one or more of such devices are not in a locked state, then the chassis computing device 140 can instruct such devices to transition to a locked state, such as via the communications 171, 172, 174 and 175, respectively.

In one embodiment, the communications 171, 172, 173, 174, 175 and 176 can be through General-Purpose Input Output (GPIO) connections, including serial and parallel communicational connections operating on 3.3V signaling, 5V signaling, 12V signaling, or other like communicational signaling paradigms. Each of the various security devices, such as the hard disk locking devices 161 and 162, the server blade locking devices 163 and 164, the communication ports locking device 165 and the video capture device 166 can comprise the relevant components and hardware by which such communicational signaling, received via the communications 171, 172, 173, 174, 175 and 176, respectively, can cause those physical security devices to transition into another physical state, as instructed.

As can be seen, the above-described mechanisms can prevent or enable physical access to individual components of a server chassis, such as individual storage devices, or groups of storage devices, individual server blades, or groups of server blades, individual communication ports, or groups of communication ports, and other like individual components. In such a manner, the components of a server chassis, such as the exemplary server chassis 101 shown in FIG. 1, can be protected at a more granular level, which can reduce both malicious attacks and inadvertent errors. For example, since access can be granted on a component-by-component basis, instead of on a room-by-room, or rack-by-rack basis, the sheer quantity of computing components to which a user would have access can be reduced, thereby reducing the impact of a malicious attack. More specifically, a user seeking to maliciously damage computing components of a server chassis would, utilizing the above-described mechanisms, likely only have access to one or two such components, instead of all of the physical components. Similarly, a user, such as a repair technician, that was directed to repair only a specific component, such as replacing a failed server blade, can have the above-described mechanisms act as a double check to ensure that such a technician does not replace the wrong server blade. For example, if a technician was sent in to replace the exemplary server blade 131, shown in FIG. 1, then a corresponding physical access control list can grant such a technician physical access only to the server blade 131. Consequently, when such a technician enters their user identification via the user identification input device 151, the chassis computing device 140 can reference such physical access control information, and can subsequently instruct the server blade locking device 163 to be in an unlocked state. The remaining physical security devices can be instructed to be in a locked state, or other appropriate state. Should the technician accidentally attempt to remove the server blade 132, instead of the server blade 131 that the technician was directed to remove, the server blade locking device 164 can remain in a locked state and can, thereby, prevent the user from removing such a server blade 132. Such a physical prevention can then act to signal, to the technician, that they are attempting to remove the wrong server blade, and can, thereby, reduce the risk of inadvertent and accidental disruption of the computing being performed by the computing components of the exemplary server chassis 101.

The above-described mechanisms can also be integrated with industrial automation systems, robotic access, and other like automated physical access of physical components. For example, a robotic system can be utilized to physically access and remove a storage component such as, for example, the exemplary hard disk 121, and replace it with a new hard disk. In such an example, the robotic system can, inadvertently, attempt to access in different hard disk, such as, for example, the exemplary hard disk 122. For example, the robotic system can become misaligned, or can otherwise have incorrectly identified the exemplary hard disk 122 as the exemplary hard disk 121. In such an instance, when the robotic system attempts to access exemplary hard disk 122, it can be prevented from doing so, such as by the hard disk locking device 162. In the same manner that such a physical prevention acted as a signal, such as to a human user or technician, that were are attempting to remove the wrong device, it can similarly signal to an automatic system, such as a robotic system, that the incorrect device is being physically accessed.

In addition to physical locking devices, physical security devices can include information collection devices, such as the video capture device 166. As indicated previously, processing performed by the computing components of a data center can include processing associated with minimum security requirements, such as the requirement that the computing hardware performing such processing be placed under video surveillance. In such an instance, if such processing is transitioned to one or more of the server blades of a server chassis, such as the exemplary server blades 131 and 132, of the exemplary server chassis 101, then the chassis computing device 140 can receive information conveying such minimum security requirements, and can activate the video capture device 166, such as via the communications 176. The video capture device 166 can, then, continue to capture video until such processing is transitioned away from the computing components of the server chassis 101, or is otherwise complete. Alternatively, or in addition, the video capture device 166 can be activated or deactivated, such as via the communication 176 from the chassis computing device 140, in accordance with information that is part of, or associated with, the physical access control information that is part of the physical access control list store 141. For example, much like a physical access control list can associate physical access to one or more computing components, such as exemplary server blade 131, with one or more users or groups of users, such a physical access control list can also associate video surveillance with one or more users or groups of users. Thus, a user having physical access to the exemplary server blade 131 can also, as part of the granting of that physical access, such as by unlocking the server blade locking device 163, also have video surveillance of such a user be triggered, such as by commencing the capture of video by the video capture device 166.

In one embodiment, a physical access control list can enable the provision of physical access rights in a more dynamic way then traditional physical access rights provided by, for example, physical keys. For example, the physical access control list can enable the provision of One-Time Passwords (OTPs) by which a user can be granted access to one or more computing components for a discreet and defined period of time. Returning to the above example in which a technician is directed to replace the exemplary server blade 131 which, in the above example, can have failed, such a technician can be granted the right to physically access the server blade 131 only during a defined window of time. Consequently, such a technician can be physically prevented from negatively impacting other computing components, and can likewise be physically prevented from returning at a later point in time to negatively impact a replaced and operational server blade 131. For example, a physical access control list can be modified to include user information corresponding to such a technician and access rights associated with such user information that correspond to physical access the exemplary server blade 131. A physical access control list can also be modified to include an expiration time for such an entry, after which such an entry would no longer be valid and could be deleted from the physical access control list. Alternatively, the access control list could simply be modified any later point in time to remove the access rights previously granted to, for example, such a technician.

Although the descriptions above been within the context of changes in the physical state of one or more physical security devices, such as one or more blocks, physical access control lists can associate logical responses with one or more users, or groups of users. More specifically, a user can have, associated with their identification, in a physical access control list, information indicating that when such a user provides their identification via the user identification input device 151, in addition to one or more physical access rights that such a user may have, one or more logical actions can also be performed such as, for example, the chassis computing device 140 generating a log of the user's activity. Such logs can be stored in a log store 142 that can be co-located with the chassis computing device 140, as illustrated by the communication 149, or, alternatively, or in addition, such a log store 142 can also be stored on a remote computing device. As yet another alternative, the log store 142 can remain co-located with the server chassis 101, but can be generated by a computing device that is remote from the server chassis 101, such as exemplary centralized control computing device 180. Other logical actions can, likewise, be associated with users or groups of users via a physical access control list. As another example, upon receiving user identification, such as via the exemplary user identification input device 151, the chassis computing device 140 can determine, such as with reference to the information in the physical access control list store 141, that the chassis computing device 140 should provide remote notification of the input of such a user's identification into the user identification input device 151. As will be recognized by those skilled in the art, such information can be utilized to track the physical location and physical activity of various users, such as data center technicians.

While the above descriptions are directed to the ability of various physical security devices to be controlled by communications originating from a computing device, such as the chassis computing device 140, in other embodiments the physical security devices can also be operated manually, such as by a physical key inserted into a physical lock tumbler. Other types of the physical security devices that can also be operated manually include physical locks that open based on the provision of data, such as a password, PIN, fingerprint or other biometric information, or other like data. The manual override of a physical security lock can, in one embodiment, trigger communication, from such a lock, back to a computing device, such as the chassis computing device 140. The chassis computing device 140 can take such a manual override into account when providing instructions to physical security devices. For example, if a physical access control list indicates that a user, corresponding to the user identification provided via the user identification input device 151, is not to be provided with physical access the server blade 132, then the chassis computing device 140 can instruct the server blade locking device 164 to remain in, or transition to, a locked state. If sensors associated with the server blade locking device 164, or other sensors directed to the physical presence of the server blade 132, indicate that the server blade 132 has been physically removed anyway, the chassis computing device 140 can take appropriate action, such as generating and audio alarm, a visual alarm, generating an alarm notification at a remote location, and other like alarm actions. The chassis computing device 140 can also take appropriate logical actions, such as logging the unauthorized removal of the server blade 132 in the log store 142. However, if the chassis computing device 140 had received information indicative of a manual override being used to unlock the server blade locking device 164, the chassis computing device 140 can not generate such alarm notifications, or can respond with alternative logical security measures, such as initiating logging, or generating a different type of alarm, such as one that can act to notify rather than signal an emergency. Similarly, if the chassis computing device 140 receives information indicative of a manual override being used to unlock the server blade locking device 164, the chassis computing device 140 cannot continue to transmit signals to the server blade locking device 164 instructing it to transition to a locked state and, thereby, avoid an undesirable looping scenario whereby a user is physically attempting to transitional locked to one physical state while a computing device is continuously transitioning the lock back to another state.

As indicated previously, in one embodiment, the exemplary server chassis 101 can include a backup power supply 112 that can provide power for one or more of the physical security devices, thereby enabling the computing components of the server chassis 101 to remain protected even in the event of a loss of primary power. For example, the backup power 112 can provide sufficient power to transition all of the physical locking devices to a locked state to prevent any removal of computing components from, or addition of new computing components to, the server chassis 101 prior to the restoration of primary power. As another example, the backup power 112 can provide sufficient power to operate specific physical security devices, such as the video capture device 166, to continue to monitor the server chassis 101 during a primary power outage. As yet another example, the backup power 112 can provide sufficient power to provide a smooth transition in the event of a loss of primary power such as, for example, allowing a technician to complete whatever removal or replacement operation was ongoing when primary power was lost prior to transitioning all of the physical locking devices to a locked state. In one embodiment, upon restoration of primary power, the chassis computing device 140 can cause the physical locking devices to remain in the locked state until a physical key, or other like manual override, is used to unlock them. Analogous way, upon restoration of primary power, the chassis computing device 140 can also perform various self-test functionality to ensure that the physical locking devices, and other physical security devices, are properly operational.

While the above mechanisms have been described within the context of operations performed by the chassis computing device 140, as indicated previously, and as illustrated by the dashed box and arrow, the data and processing illustrated is being co-located with the server chassis 101, such as in the form of the chassis computing device 140 and the stores 141 and 142, can equally be located on, and performed by, remote computing devices, including computing devices at a centralized control facility. In addition to the above mechanisms being performed by remotely located computing devices, such as the centralized control computing device 180, various ones of the physical access control list store 141 and the log store 142 can also be located remotely from the server chassis 101, or can remain co-located with the server chassis 101 irrespective of the location of the above-described processing.

Figure 2:
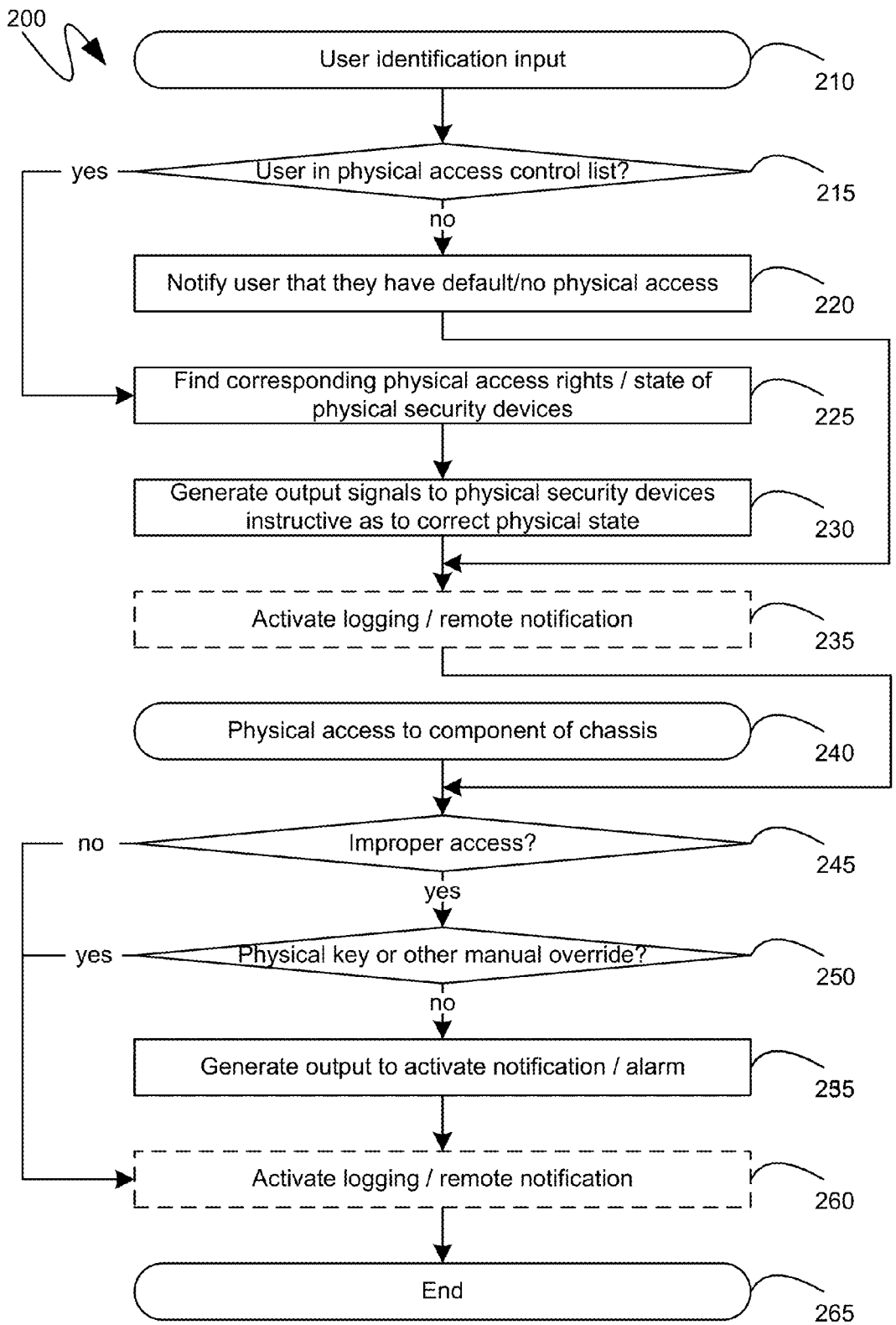
FIG. 2 is a flow diagram of an exemplary management of physical security components.

Turning to FIG. 2, the flow diagram 200 shown therein illustrates an exemplary series of steps that can be performed, such as by the chassis computing device 140, shown in FIG. 1, the centralized control computing device 180, also shown in FIG. 1, or combinations thereof. Initially, as represented by step 210, user identification input can be received that can identify and authenticate a user. As will be recognized by those skilled in the art, user identification and authentication can be provided via a single input, such as a PIN or other like identifier, or can be two or more separately provided inputs, such as a user identification input and a subsequent authentication input. Irrespectively of how such user identification and authentication is provided, at step 210, processing can proceed to step 215 where, if the user has been properly identified and authenticated, at step 210, a determination can be made, at step 215, as to whether the user is identified in a physical access control list. If, step 215, is determined that there is no entry in the physical access control list corresponding to the user whose identification was received at step 210, then the system cannot ascertain any physical access rights for such a user, and processing can proceed to step 220, at which point the user can be notified, that they do not have any physical access rights. In one embodiment, at step 220, rather than notifying the user that they do not have any physical access rights, the user notification can, instead, notify the user that they have default physical access rights, which can include, for example, the right to physically access computing components if the user possesses a physical key or other like manual override.

However, if, at step 215, is determined that the identified user is in the physical access control list, then processing can proceed to step 225, at which point the physical access control list can be consulted to find the physical access rights corresponding to the identified user, as contained in the physical access control list. In one embodiment, as described previously, a physical access control list can comprise information associating a user, or a group of users, with physical access rights to one or more computing components, such as of a server chassis. In such an embodiment, further reference can, then, be made to ascertain the physical states of one or more physical security devices corresponding to the indicated physical access rights. In another embodiment, however, as also described previously, a physical access control list can directly specify the physical states of one or more physical security devices corresponding to the physical access rights associated with a user or a group of users. At step 225, therefore, the physical state of such physical security devices can be ascertained, either directly from the physical access control list, or from physical access rights obtained from the physical access control list, together with additional information. Subsequently, at step 230, output signals can be generated to one or more physical security devices instructive as to the correct physical state of such physical security devices. For example, in one embodiment, at step 230, output signals can be generated only to the physical security devices whose physical state is to change, such as to change from a locked state to an unlocked state or, conversely, to change from an unlocked state to a locked state. In another embodiment, however, at step 230, output signals can be generated both to physical security devices whose physical state is to change, as well as to physical security devices whose physical state is to remain as before, thereby providing a further verification that the physical security devices are in the correct physical state.

At step 235, in addition to the generation of instructive signals the physical security devices at step 230, logging, remote notification, or other like logical action can be initiated or continued. Step 235 is illustrated, in the exemplary flow diagram 200 of FIG. 2, via dashed lines to indicate that it is an optional step. Additionally, in one embodiment, if, at step 215, it is determined that the identified user does not have a corresponding entry in the physical access control list, processing can continue even after the user has been notified, at step 220. Namely, in one embodiment, processing can proceed with the logging, remote notification, or other logical actions, as represented by the optional step 235.

In one embodiment, processing can proceed with step 245. Additionally, step 245 can be an initial step of a sequence of operations that can commence when, at step 240, physical access to one or more computing components is detected. At step 245, a determination can be made as to whether the physical access that has been performed is an improper access. More specifically, if a physical access is detected either without any user providing identification input, or the physical access that is detected is of a computing component that the identified user does not have the right to physically access, then a determination can be made, at step 245, that the access was improper. If the contrary determination is made, namely that the access was proper, then processing can proceed to step 260, at which point logical actions, such as the activation of a logging of the access, a remote notification of the access, or other logical actions can, optionally, be performed. The relevant processing can then end at step 265.

Subsequent to a determination, at step 245, then an improper access was detected, processing can proceed, in one embodiment, to step 250, where determination can be made as to whether the access that was deemed to be improper was with a physical key or other like manual override. For example, a user can have gained physical access to a computing component because the user can have a physical key that unlocked the physical lock protecting such a computing component. Or, as another example, a user can have gained physical access to a computing component because the user can have provided biometric information to a biometric physical lock that was protecting such a computing component. In such instances, in one embodiment, such a manual override can take precedence over access rights, as determined with reference to one or more physical access control lists. Consequently, if, at step 250, it is determined that the access was with a physical key, then processing can proceed to step 260. Conversely, if the determination, at step 250, is that the improper access was gained without a physical key or other, proper, manual override, then output can be generated to security components that can generate an alarm, including auditory signaling, visual signaling, logical notifications, and other like alarms. In addition to generating such alarm, at step 255, processing can also, optionally, perform step 260, as described above. The relevant processing can then end at step 265.

Figure 3:
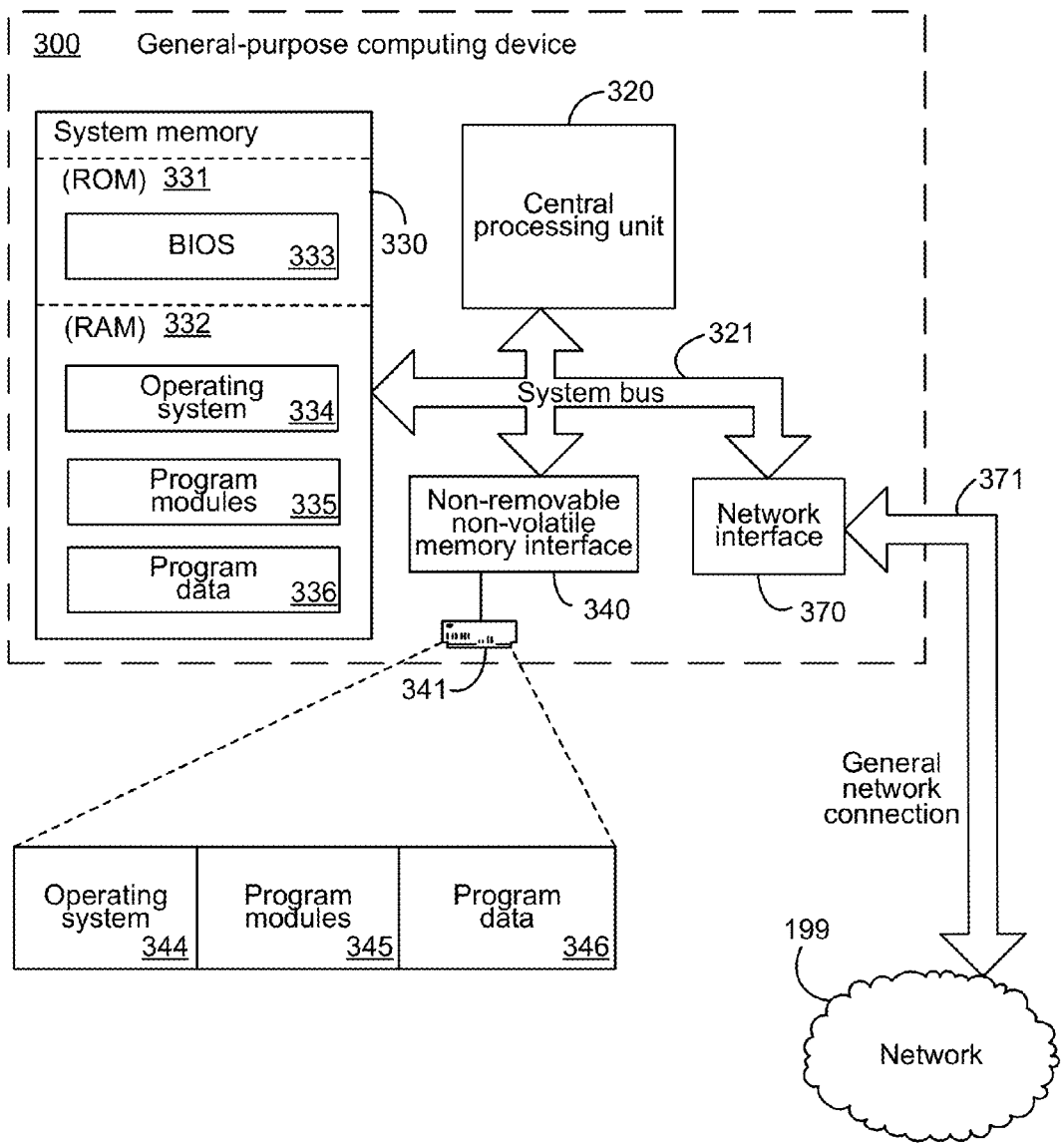
FIG. 3 is a block diagram illustrating an exemplary general purpose computing device.

In one embodiment, the steps of the flow diagram 200 of FIG. 2 can be performed by one or more of the computing devices of a server chassis, such as the exemplary server chassis 101, shown in FIG. 1, or can be performed by one or more computing devices that are remote from such a server chassis and, indeed, can be remote from the data center itself. Turning to FIG. 3, an exemplary general-purpose computing device, such as one of the one or more computing devices that can perform the steps of the flow diagram of FIG. 2, is illustrated in the form of the exemplary general-purpose computing device 300. The exemplary general-purpose computing device 300 can include, but is not limited to, one or more central processing units (CPUs) 320, a system memory 330 and a system bus 321 that couples various system components including the system memory to the processing unit 320. The system bus 321 may be any of several types of bus structures including a memory bus or memory controller, a peripheral bus, and a local bus using any of a variety of bus architectures. Depending on the specific physical implementation, one or more of the CPUs 320, the system memory 330 and other components of the general-purpose computing device 300 can be physically co-located, such as on a single chip. In such a case, some or all of the system bus 321 can be nothing more than communicational pathways within a single chip structure and its illustration in FIG. 3 can be nothing more than notational convenience for the purpose of illustration.

The general-purpose computing device 300 also typically includes computer readable media, which can include any available media that can be accessed by computing device 300. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 300. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computing device 300, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, other program modules 335, and program data 336.

When using communication media, the general-purpose computing device 300 may operate in a networked environment via logical connections to one or more remote computers. The logical connection depicted in FIG. 3 is a general network connection 371 to the network 199, which can be a local area network (LAN), a wide area network (WAN) such as the Internet, or other networks. The computing device 300 is connected to the general network connection 371 through a network interface or adapter 370 that is, in turn, connected to the system bus 321. In a networked environment, program modules depicted relative to the general-purpose computing device 300, or portions or peripherals thereof, may be stored in the memory of one or more other computing devices that are communicatively coupled to the general-purpose computing device 300 through the general network connection 371. It will be appreciated that the network connections shown are exemplary and other means of establishing a communications link between computing devices may be used.

The general-purpose computing device 300 may also include other removable/non-removable, volatile/nonvolatile computer storage media. By way of example only, FIG. 3 illustrates a hard disk drive 341 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340.

The drives and their associated computer storage media discussed above and illustrated in FIG. 3, provide storage of computer readable instructions, data structures, program modules and other data for the general-purpose computing device 300. In FIG. 3, for example, hard disk drive 341 is illustrated as storing operating system 344, other program modules 345, and program data 346. Note that these components can either be the same as or different from operating system 334, other program modules 335 and program data 336. Operating system 344, other program modules 345 and program data 346 are given different numbers here to illustrate that, at a minimum, they are different copies.

As can be seen from the above descriptions, mechanisms for providing discrete-component-level physical security have been described. Which, in view of the many possible variations of the subject matter described herein, we claim as our invention all such embodiments as may come within the scope of the following claims and equivalents thereto.

We claim:

1. A chassis comprising:
a first removable computing component;
a first physical locking device configured to prevent removal of the first computing component when in a locked state and configured to allow removal of the first removable computing component when in an unlocked state, the first physical locking device being controllable, via a first communicational connection, to transition between the locked state and the unlocked state, wherein the first physical locking device comprises a manual override that manually transitions the first physical locking device between the locked state and the unlocked state and overrides a prior state of the first physical locking device established via the first communicational connection; and
a chassis computing device communicationally coupled to the first physical locking device via the first communicational connection, the chassis computing device configured to perform steps comprising:
receiving an identification of a user;
determining physical access rights of the user;
generating, in response to the determining, a first output, to the first physical locking device, via the first communicational connection, causing the first physical locking device to transition to, or remain in, the locked state if the determined physical access rights of the user do not include physical access rights to the first removable computing component;
detecting that the first removable computing component has been removed; and
triggering a first alarm notification in response to the detecting the removing of the first removable computing device, the first alarm notification differing from a second alarm notification that would have been triggered if the removing of the first removable computing device had been detected by the manual transitioning of the first physical locking device had not been detected;
wherein the generated first output causes the first physical locking device to transition to, or remain in, the unlocked state if the determined physical access rights of the user do include physical access rights to the first removable computing component.

2. The chassis of claim 1, wherein the first removable computing component is a server blade.

3. The chassis of claim 1, wherein the first removable computing component comprises at least one computer-readable storage device.

4. The chassis of claim 1, further comprising a user identification input device communicationally coupled to the chassis computing device, wherein the identification of the user is received, by the chassis computing device, from the user identification input device.

5. The chassis of claim 1, further comprising:
a set of communication ports into which one or more cables are physically insertable;
a first communication ports locking device, controllable via a second communicational connection, the first communication ports locking device configured to prevent insertion of a cable into at least one communication port of the set of communication ports when in a locked state and configured to allow insertion of the cable into the at least one communication port of the set of communication ports when in an unlocked state.

6. The chassis of claim 5, wherein the set of communication ports are part of the first removable computing component.

7. The chassis of claim 1, comprising:
a second removable computing component, removable independently of the first removable computing component; and
a second physical locking device, separate from the first physical locking device, the second physical locking device controllable via a second communicational connection, the second physical locking device configured to prevent removal of the second computing component when in a locked state and configured to allow removal of the second removable computing component when in an unlocked state;
wherein the chassis computing device is configured to perform further steps comprising generating, independently of the first output, a second output, to the second physical locking device, via the second communicational connection, wherein the generated second output causes the second physical locking device to transition to the locked state if the determined physical access rights of the user do not include physical access rights to the second removable computing component and wherein further the generated second output causes the second physical locking device to transition to the unlocked state if the determined physical access rights of the user do include physical access rights to the second removable computing component.

8. The chassis of claim 1, further comprising: a video capture security device controllable via a second communicational connection; wherein the chassis computing device is configured to perform further steps comprising: generating, after the determining the physical access rights of the user, and in response thereto, a second output to the video capture security device, the generated second output causing the video capture security device to initiate capturing video.

9. The chassis of claim 1, wherein the first physical locking device comprises a physical lock operable with a physical key, the physical lock also controlling whether the first physical locking device is in the locked state or the unlocked state.

10. The chassis of claim 9, wherein the chassis computing device is configured to perform further steps comprising: detecting whether the first physical locking device was transitioned between the locked state and the unlocked state with the physical key.

11. The chassis of claim 1, wherein the chassis computing device is configured to perform further steps comprising: generating, in response to the determining, at least one log entry associated with the user.

12. The chassis of claim 1, further comprising a backup power source providing backup power to the first physical locking device.

13. One or more computer-readable storage media comprising computer-executable instructions for controlling access to individual computing components of a server chassis, the computer-executable instructions directed to steps comprising:
receiving an identification of a user;
determining physical access rights of the user; and
generating, in response to the determining, a first output, to a first physical locking device, via a first communicational connection, causing the first physical locking device to transition to, or remain in, a locked state preventing removal of a first removable computing component of the server chassis if the determined physical access rights of the user do not include physical access rights to the first removable computing component, wherein the first physical locking device comprises a manual override that manually transitions the first physical locking device between the locked state and the unlocked state and overrides a prior state of the first physical locking device established via the first communicational connection;

detecting that the first removable computing component has been removed; and triggering a first alarm notification in response to the detecting the removing of the first removable computing device, the first alarm notification differing from a second alarm notification that would have been triggered if the removing of the first removable computing device had been detected by the manual transitioning of the first physical locking device had not been detected;

wherein the generated first output causes the first physical locking device to transition to, or remain in, the unlocked state allowing removal of the first removable computing component from the server chassis if the determined physical access rights of the user do include physical access rights to the first removable computing component.

14. The computer-readable storage media of claim 13, wherein the determining the physical access rights comprises referencing a physical access control list correlating users to physical access rights.

15. The computer-readable storage media of claim 14, wherein the physical access control list comprises at least one entry having an expiration time after which the physical access rights specified by the at least one entry expire.

16. The computer-readable storage media of claim 13, comprising further computer-executable instructions for: generating, independently of the first output, a second output, to a second physical locking device, via a second communicational connection, wherein the generated second output causes the second physical locking device to transition to a locked state preventing removal of a second removable computing component of the server chassis, separate and independent of the first removable computing component, if the determined physical access rights of the user do not include physical access rights to the second removable computing component and wherein further the generated second output causes the second physical locking device to transition to an unlocked state allowing removal of the second removable computing component from the server chassis if the determined physical access rights of the user do include physical access rights to the second removable computing component.

17. A system comprising:
   a server chassis, the server chassis comprising:
      a first removable computing component; and
      a first physical locking device configured to prevent removal of the first computing component when in a locked state and configured to allow removal of the first removable computing component when in an unlocked state, the first physical locking device being controllable, via a first communicational connection, to transition between the locked state and the unlocked state, wherein the first physical locking device comprises a manual override that manually transitions the first physical locking device between the locked state and the unlocked state and overrides a prior state of the first physical locking device established via the first communicational connection; and
   a centralized control computing device separate and apart from the server chassis, the centralized control computing device configured to perform steps comprising:
      receiving an identification of a user;
      determining physical access rights of the user;
      generating, in response to the determining, a first output, to the first physical locking device, via the first communicational connection, causing the first physical locking device to transition to, or remain in, the locked state if the determined physical access rights of the user do not include physical access rights to the first removable computing component;
      detecting that the first removable computing component has been removed; and
      triggering a first alarm notification in response to the detecting the removing of the first removable computing device, the first alarm notification differing from a second alarm notification that would have been triggered if the removing of the first removable computing device had been detected by the manual transitioning of the first physical locking device had not been detected;
      wherein the generated first output causes the first physical locking device to transition to, or remain in, the unlocked state if the determined physical access rights of the user do include physical access rights to the first removable computing component.

18. The system of claim 17, wherein the server chassis comprises a computer-readable storage medium having stored thereon a physical access control list correlating users to physical access rights; and wherein further the determining, by the centralized control computing device, of the physical access rights of the user comprises referencing the physical access control list stored on the computer-readable storage medium of the server chassis.

19. The system of claim 18, wherein the physical access control list comprises at least one entry having an expiration time after which the physical access rights specified by the at least one entry expire.

20. The system of claim 17, wherein the centralized control computing device is further configured to perform further steps comprising: generating, independently of the first output, a second output, to a second physical locking device, via a second communicational connection, wherein the generated second output causes the second physical locking device to transition to a locked state preventing removal of a second removable computing component of the server chassis, separate and independent of the first removable computing component, if the determined physical access rights of the user do not include physical access rights to the second removable computing component and wherein further the generated second output causes the second physical locking device to transition to an unlocked state allowing removal of the second removable computing component from the server chassis if the determined physical access rights of the user do include physical access rights to the second removable computing component.

* * * * *